United States Patent [19]
Willersdorf

[11] 3,912,897
[45] Oct. 14, 1975

[54] METHOD AND APPARATUS FOR WELDING ELECTRICALLY CONDUCTIVE WIRES

[75] Inventor: Arthur H. Willersdorf, Hampton, Va.

[73] Assignee: Teledyne, Inc., Los Angeles, Calif.

[22] Filed: Nov. 14, 1973

[21] Appl. No.: 415,787

[52] U.S. Cl. ............... 219/58; 219/85; 219/105
[51] Int. Cl.² .................................. B23K 11/00
[58] Field of Search .......... 73/359; 219/56, 85, 101, 219/104, 58

[56] References Cited
UNITED STATES PATENTS
3,260,113  7/1966  Benson et al. .................. 73/359

OTHER PUBLICATIONS
IBM Technical Disclosure Bulletin, Vol. 16, No. 4, Sept., 1973, p. 1153, "Flexible Circuit Package for Mechanical Thermal Pulse Bonding," W. R. DeBoskey.

Primary Examiner—J. V. Truhe
Assistant Examiner—N. D. Herkamp
Attorney, Agent, or Firm—Cushman, Darby & Cushman

[57] ABSTRACT

A pair of wires are brought into contact at the place where they are to be joined. The wires are electrically energized to generate heat thereby raising their temperature to a level where molecular diffusion will cause the wires to coalesce at their junction point.

6 Claims, 1 Drawing Figure

U.S. Patent  Oct. 14, 1975  3,912,897
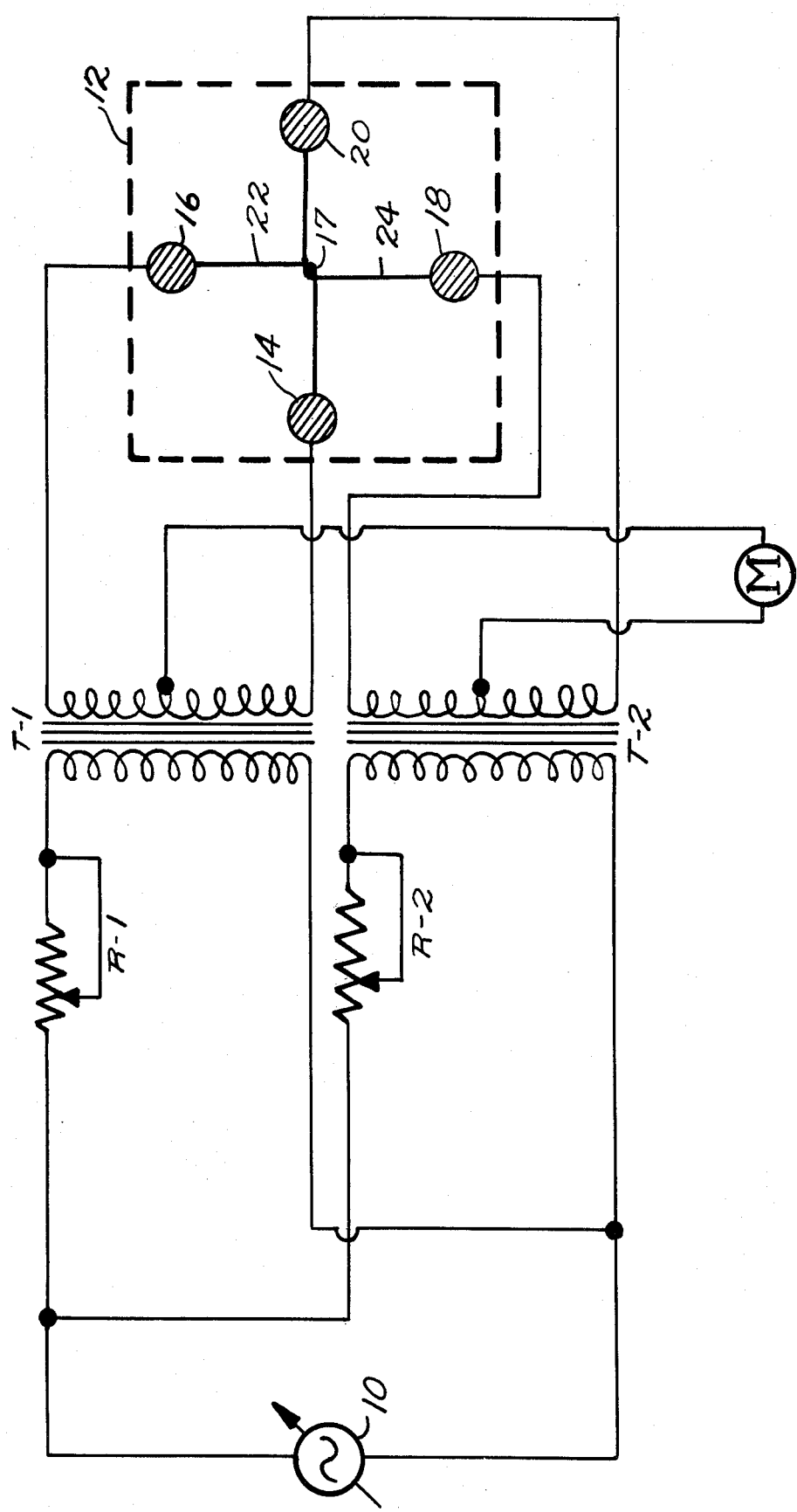

METHOD AND APPARATUS FOR WELDING ELECTRICALLY CONDUCTIVE WIRES

BACKGROUND OF THE INVENTION

The present invention is directed to a method and apparatus for welding electrically conductive wires to one another. Conventional techniques for this purpose, such as flame welding and spot welding, have been found to be unsatisfactory, particularly as the diameter of the wire decreases.

The shortcomings of flame welding are that the heat generated may severely weaken the wires, and the process results in a relatively large bead being formed at the weld. Such a bead is particularly undesirable when the welded junction serves in a sensitive application, such as a thermocouple.

The spot welding technique, as is disclosed, for example, in U.S. Pat. No. 3,260,113 — James M. Benson et al. — which was issued on July 12, 1966, also creates practical difficulties. Spot welding is a resistance-welding process wherein coalescence results from localized melting of the materials caused by the heat obtained from resistance to the flow of electric current through the work parts held together under pressure by electrodes. The size and shape of the weld is a function of the size and contour of the electrodes. With spot welding, even large wires may be substantially weakened at the junction where fusion and distortion of the molten wires occur. However, with fine wires (e.g., filaments of 0.001 inch diameter and smaller), the problems created by spot welding become severe. In welding such filaments, the pressure of the electrodes is difficult to control, and excess pressure will flatten the junction of the wires resulting in a weakened weld. Also, with small wires the clearance between the welding electrodes is very narrow. Consequently, the alignment and surface condition of the electrodes become critical to prevent arcing. Furthermore, it is difficult to balance the heat input with the electrodes to obtain optimum fusion when welding small wires of dissimilar materials.

The present invention overcomes the foregoing difficulties. Briefly, this is accomplished by establishing contact between the wires at the desired junction point. The wires are then individually energized by a controlled electrical source thereby raising the temperature of the wires until temperatures sufficient for molecular diffusion of one material to another occur. This is achieved without the melting point of the wires being reached. The result is a welded joint which is not distorted or weakened as it would be by prior art techniques.

The invention will be described in more detail with reference to the accompanying drawing which illustrates a schematic diagram of a circuit arrangement for performing the improved welding operation.

The circuit shown in the drawing includes a variable alternating current source 10 which may take the form of a conventional adjustable voltage source coupled with a regulating transformer. Source 10 is connected via variable resistances R-1 and R-2 to the primary windings of step-down transformers T-1 and T-2, respectively. The secondary windings of T-1 and T-2 are joined to terminals appropriately mounted in a jig 12 so as to be electrically insulated from one another. More particularly, the ends of the secondary winding of transformer T-1 are connected to terminals 14 and 16, respectively, and the ends of the secondary winding of T-2 are coupled to terminals 18 and 20, respectively. Terminals 14, 16, 18 and 20 are dimensioned so as to serve as heat sinks.

The wires to be welded together are designated as 22 and 24. These wires are positioned in contacting relationship within jig 12 at the desired junction point 17 (usually at the mid-span of each wire), the contact being established, for example, by a half twist which results in the ends of wire 22 being connected to terminals 14 and 16 and the ends of wire 24 being joined to terminals 18 and 20. When so connected, the wires are self-supporting at the junction 17, and enough pressure exists at the junction to achieve a weld without breaking the wire.

A meter M is connected across points on the secondary windings of transformers T-1 and T-2. This meter preferably is a high impedance d-c millivoltmeter, the purpose of which will be explained in the description of operation now to be presented.

Once wires 22 and 24 are positioned in contacting relationship within jig 12 and are connected to the terminals 14, 16, 18 and 20 in the manner previously described, heating current is applied to each of the wires from source 10. The magnitude of the energization of the wires is independently controlled for each wire 22 and 24 by resistors R-1 and R-2, respectively. This is particularly important when wires 22 and 24 are of dissimilar material. As a result, the temperature levels of the wires are raised, the hottest part of each wire occurring at junction 17. These levels are independently increased in the wires until a point is reached for each wire (below the wire's melting point) at which molecular diffusion of one material into the other occurs. This diffusion is sustained over a period of time resulting in a strong weld being effected without distortion and weakening of the wire as is experienced with previously known welding techniques.

When wires 22 and 24 are of dissimilar material, they form a thermoelectric junction. To assist in monitoring the diffusion welding process when such a thermoelectric junction exists, the taps from the secondary windings of T-1 and T-2 are connected to meter M to form a bridge circuit and are adjusted so that no a-c voltage due to the a-c heating currents appears across meter M. Accordingly, the meter indicates only the net d-c voltage thermoelectrically generated at junction 17 thereby guiding the operator in adjusting the temperature and controlling the time to produce strong diffusion welds of uniform size.

While the preferred form of the invention has been described as using as alternating current source to heat wires 22 and 24, a direct current source could be used with suitable circuit modifications to achieve the same results.

While the diffusion welding technique just described is useful in a wide variety of applications, it is particularly advantageous in the welding of wire having dimensions less than approximately 0.001 inch and wires of different compositions such as are employed in producing a thermoelectric junction. The technique described is also most suitable to automatic control.

What is claimed is:

1. A method for welding electrically conducting wires together, comprising the steps of:

maintaining said wires in self-supporting contacting relationship at a junction point spaced from the ends of the wires; and energizing each of said wires at its ends form a current source connected to said wires to raise their temperature to a level where molecular diffusion will cause the wires to coalesce at their junction point.

2. A method as set forth in claim 1, wherein said wires are of different materials so as to form a thermoelectric junction as said junction point.

3. A method as set forth in claim 2, further comprising the step of monitoring the weld by measuring thermoelectric voltage generated at said junction point during fusion.

4. A method as set forth in claim 1, further comprising independently energizing and controlling the temperature level of each wire.

5. A method as set forth in claim 1, further comprising the step of securing the ends of each wire to heat sinks.

6. A method as set forth in claim 5, wherein said junction point is placed intermediate the ends of the wires at their mid-spans.

* * * * *